United States Patent [19]

Kudo et al.

[11] Patent Number: 4,892,398
[45] Date of Patent: Jan. 9, 1990

[54] TRIPLET TYPE OBJECTIVE WITH A DIAPHRAGM ARRANGED BEHIND THE LENS SYSTEM

[75] Inventors: Yoshinobu Kudo; Akira Fukushima; Kazuo Kimura; Mitsuko Date, all of Osaka, Japan

[73] Assignee: Minolta Camera Kabushiki Kaisha, Osaka, Japan

[21] Appl. No.: 272,759

[22] Filed: Nov. 17, 1988

[30] Foreign Application Priority Data

Nov. 18, 1987 [JP] Japan ................................. 62-291479

[51] Int. Cl.$^4$ ............................................. G02B 9/14
[52] U.S. Cl. .................... 350/475; 350/449; 350/432
[58] Field of Search ................ 350/474, 475, 449, 432

[56] References Cited

U.S. PATENT DOCUMENTS

| | | | |
|---|---|---|---|
| 3,784,287 | 1/1974 | Grey | 350/475 |
| 4,105,308 | 8/1978 | Owen, Jr. et al. | 350/432 |
| 4,542,961 | 9/1985 | Sato | 350/475 |

Primary Examiner—P. M. Dzierzynski
Attorney, Agent, or Firm—Price, Gess & Ubell

[57] ABSTRACT

In a triplet type objective for a compact lens shutter camera with a diaphragm arranged behind the lens system, the first and the second lens elements are formed of plastic and the third lens element is formed of glass, so that it is advantageous in manufacturing cost and weight. Therefore, an F No. of the objective is small and aberrations, for example astigmatic difference, are corrected well.

3 Claims, 3 Drawing Sheets

Spherical Aberration
Sine Condition

Astigmatism

Distortion

Spherical Aberration
Sine Condition

Astigmatism

Distortion

Spherical Aberration
Sine Condition

Astigmatism

Distortion

TRIPLET TYPE OBJECTIVE WITH A DIAPHRAGM ARRANGED BEHIND THE LENS SYSTEM

BACKGROUND OF THE INVENTION

1. Field of the Invention

The present invention relates to an objective for compact lens-shutter cameras whose diaphragm is arranged behind the whole optical system, and more particularly to a compact wide angle objective with a simple construction for cameras for a spread use.

2. Description of the Prior Art

With a compact lens-shutter camera for cameras for a spread use, a wide angle objective with a diaphragm arranged behind the whole lens system is advantageous for accommodation in the camera, for compactization of the camera or the objective itself and for realization of precise focusing. As this kind of objective, triplet type objectives with F No. 4~2.8 and a total angular field coverage of 60°~64° have been proposed. With a wide angle triplet type objective, since a astigmatic difference tends to become large at a marginal angular field, it was conventional to construct this type of objective by using lens elements formed of glass with a high refractive index. For example, in Japanese patent application laid-open number Sho. 59-34510, all lens elements, one or two of which have an aspherical surface, are formed of glass with a high refractive index to construct an objective with a total angular field coverage of 64°, and F No. 3.5. In Japanese patent application laid-open number Sho. 57-2012, an objective with F No. 4 and a total angular field coverage of 64° has been realized by using glass with a high refractive index. But forming a lens element of glass of a high refractive index incurs an increase in the manufacturing cost.

On the other hand, in U.S. Pat. No. 3,784,287 or in Japanese patent application laid-open number Sho. 61-272710, a wide angle triplet type objective without using glass of a high refractive index have been proposed, but the objective in the former prior art is of F No. 5.6 and the objective in the latter prior art is of F No. 8.0 which are relatively small.

Further, in Japanese patent application laid-open number Sho. 62-183420, a wide angle triplet type objective with a diaphragm arranged behind the lens system comprising from the object side, a first positive lens formed of glass with a high refractive index, a second negative lens formed of plastic, a third positive lens formed of plastic. In the objective, the second and the third lenses are formed of plastic, so that manufacturing cost is low as well as the change in the back focus depending on the temperature is cancelled. And the first lens is formed of glass with a high refractive index, so that aberrations are corrected well. However, for securing sufficient marginal light rays, it is necessary to construct a diameter of the first lens so large that manufacturing cost tends to become high. Because, glass material, which is much expensive than plastic, is employed of the largest volume lens in the whole lens system.

SUMMARY OF THE INVENTION

An object of the present invention is to provide a triplet type wide angle objective with a compact size, a small F No. and light weight, whose manfuacturing cost is low, whose construction is advantageous in manufacturing of lens elements and whose aberrations are corrected well.

According to the present invention, the lens system comprises, from the object side, a first positive meniscus lens element having an object side surface convex to the object side, a second biconcave lens element, a third biconvex lens element and a diaphragm. The first and second lens elements are formed of plastic and the third lens element is formed of glass. Further the lens system fulfills the following conditions:

$$0.15 < N_3 - N_1 < 0.45$$

$$0.75 < N_2/N_3 < 0.90$$

wherein, $N_1$ represents the refractive index of the first lens element, $N_2$ represents the refractive index of the second lens element, and $N_3$ represents the refractive index of the third lens element.

The features of the present invention, which are believed to be novel, are set forth with particularly in the appended claims. The present invention, both as to its organization and manner of operation, together with further objects and advantages thereof, may be best understood by reference to the following description, taken in conjunction with the accompanying drawing.

DETAILED DESCRIPTION OF THE PREFERRED EMBODIMENTS

The following description is provided to enable any person skilled in the optical and camera field to make and use the invention and sets forth the best modes contemplated by the inventors for carrying out our invention. Various modifications, however, will remain readily apparent to those skilled in the art, since the generic principles of the present invention have been defined herein specifically to provide a relatively economical and easily manufactured triplet type objective. The derivation of the formulas and the relation of the powers set forth herein can be accomplished with the assistance of a computer. The present invention represents the parameters of a compromise balance of acceptable aberrrations which can be relatively easily manufactured to provide a low cost lens system for utilization with a compact lens shutter camera.

Figure 1:
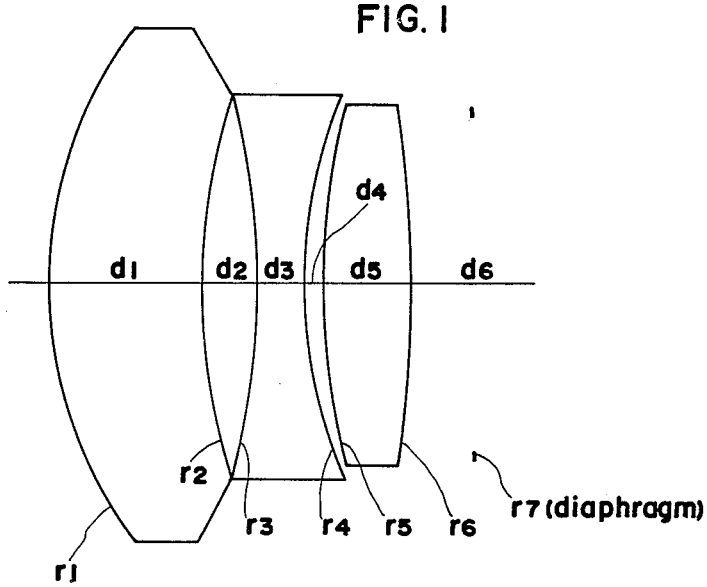
FIG. 1 is a cross sectional view of an objective according to the respective embodiments of the present invention.
Figure 2A:
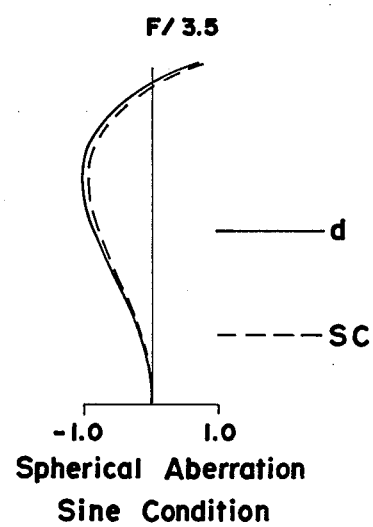
FIGS. 2A to 2C represent the aberration curves of the embodiment 1 respectively.
Figures 2B, 2C:
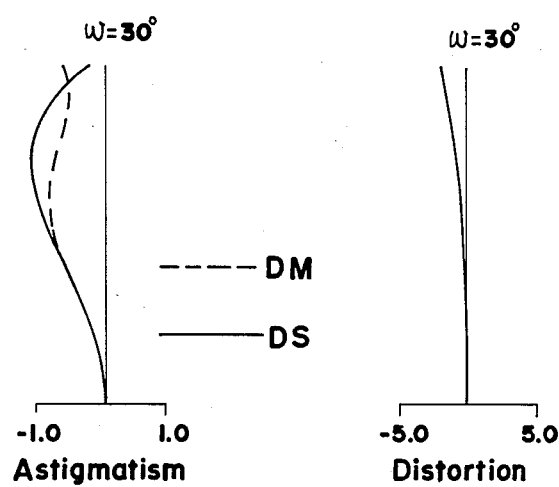
Figure 3A:
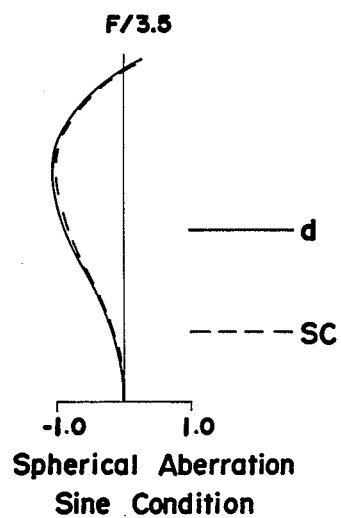
FIGS. 3A to 3C represent the aberration curves of the embodiment 2 respectively.
Figure 3B:
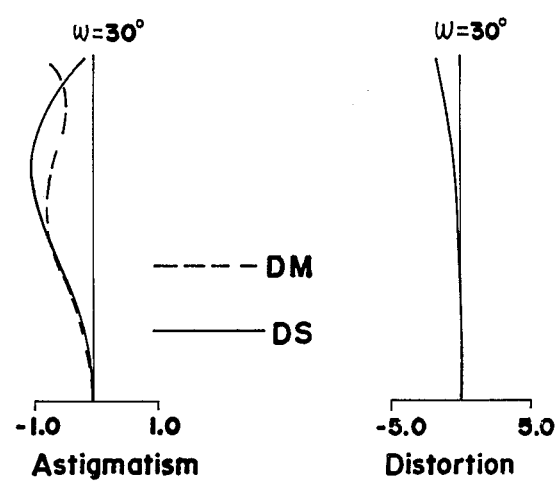
Figure 3C:
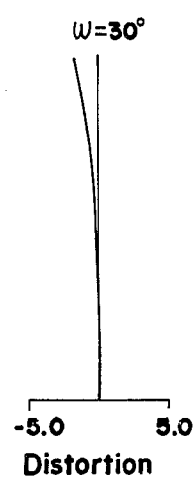
Figure 4A:
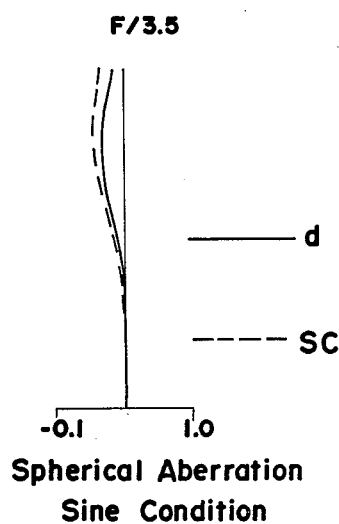
FIGS. 4A to 4C represent the aberration curves of the embodiment 3 respectively.
Figure 4B:
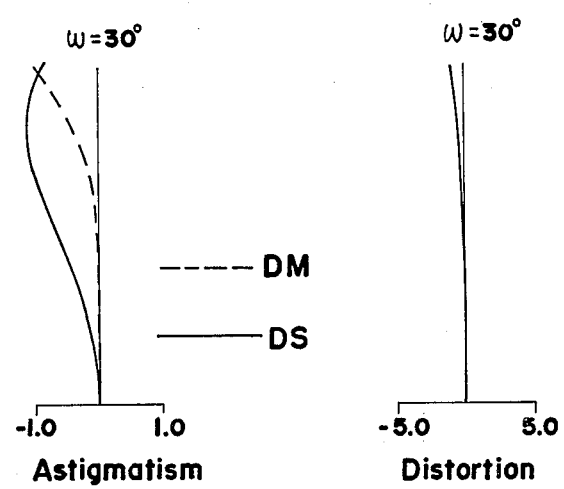
Figure 4C:
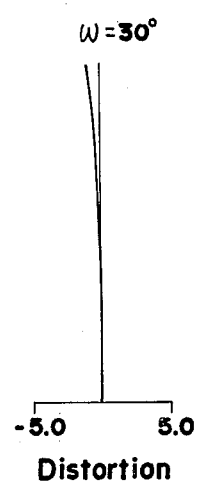
Figure 5A:
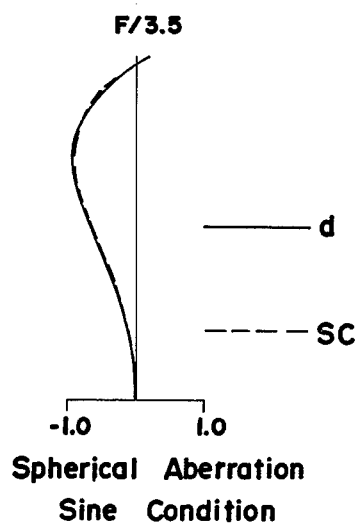
FIGS. 5A to 5C represent the aberration curves of the embodiment 4 respectively.
Figure 5B:
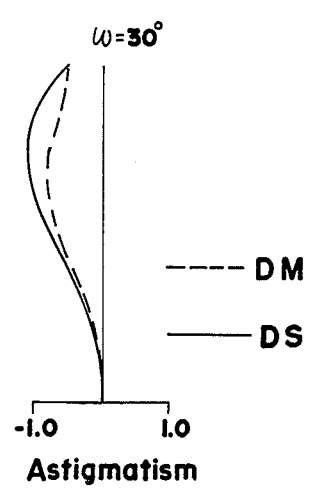
Figure 5C:
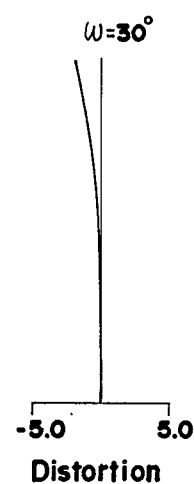

In the drawings, FIG. 1 shows the position of the lens elements. Values of radii of curvature and axial distances for each lens element and air spaces in the respective embodiments are provided in the accompanying tables set forth herein, and the schematic cross sectional view of FIG. 1 follows the normal conventions of an object at the left-hand side of the drawing and the image plane at the right-hand side.

As shown in FIG. 1, the present invention provides a lens system comprising, from the object side, a first positive meniscus lens element ($L_1$) having an object side surface convex to the object side surface, a second biconvex lens element ($L_2$), a third biconvex lens element ($L_3$), and a diaphragm (S). The first ($L_1$) and second ($L_2$) lens elements are formed of plastic and the third lens elements ($L_3$) is formed of glass. Further the lens system fulfills the following conditions:

$$0.15 < N_3 - N_1 < 0.45 \quad (1)$$

$$0.75 < N_2/N_3 < 0.90 \quad (2)$$

wherein, $N_1$ represents the refractive index of the first lens element ($L_1$), $N_2$ represents the refractive index of the second lens element ($L_2$), and $N_3$ represents the refractive index of the third lens element ($L_3$).

According to the present invention, the first positive lens element ($L_1$) and the second negative lens element ($L_2$) are made of plastic, so that the change in back focus caused by change of the temperature is cancelled. Although the first plastic lens element ($L_1$) has a low refractive index, the third lens element ($L_3$) formed of glass with a high refractive index prevents the petzval sum from becoming great. Further, because the radius of curvature of the third lens element ($L_3$) is larger than that of the first lens element ($L_1$) and the volume of the third lens element ($L_3$) is smaller than that of the first lens element ($L_1$), the weight of the lens system and the cost for manufacturing of the lens elements can decrease in comparison with a triplet type objective having a first lens element ($L_1$) formed of glass with a high refractive index.

Thus, the present invention is characterized in that the refractive index of the third lens element ($L_3$) is much greater than that of the first lens element ($L_1$) as represented by the condition (1). When the condition (1) is satisfied, image field of the objective can be kept substantially flat over angular field of 65° and the petzval sum can be kept substantially small. If the lower limit of the condition (1) is violated, the petzval sum cannot be kept small and the astigmatic difference at the great angular field becomes great. On the other hand, the upper limit of the condition (1) shows the highest limit of the refractive index of the glass which is normally available as the third lens element ($L_3$).

Condition (2) is for a ratio of the refractive index of the second lens element ($L_2$) to that of the third lens element ($L_3$). The refractive index of the second lens element ($L_2$) is about constant because the second lens element ($L_2$) is formed of plastic which is normally available for photographic lens. Therefore, if the upper limit of the condition (2) is violted, the refractive index of the third lens element ($L_3$) becomes so small that the third lens element ($L_3$) cannot be formed of glass with a high refractive index, and the petzval sum increases so much that it becomes difficult to correct the astigmatic difference and a field curvature well. On the other hand, the upper limit of the condition (2), as same as in the condition (1), shows the highest limit of the refractive index of glass which is normally available as the third lens element ($L_3$).

Furthermore, according to the present invention, it is desirable to fulfill the following conditions.

$$2.5 < d_2/d_4 < 4.0 \quad (3)$$

$$0.55 < |f_{12}|/f < 0.8 \quad (4)$$

$$0.3 < f_3/f < 0.6 \quad (5)$$

wherein, $d_2$ represents the axial distance between the first lens element ($L_1$) and the second lens element ($L_2$), $d_4$ represents the axial distance between the second lens element ($L_2$) and the third lens element ($L_3$), $f_{12}$ represents the compound focal length of the first ($L_1$) and the second ($L_2$) lens elements, $f_3$ represents the focal length of the third lens element ($L_3$), and f represents the focal length of the lens system.

Condition (3) is for correcting the field curvature well. If the upper limit of the condition (3) is violated, the petzval sum increases so much that it becomes difficult to correct the field curvature, and the diameter of the first lens element ($L_1$) must be constructed large for securing sufficient amount of marginal light rays. In contrast thereto, if the lower limit of the condition (3) is violated, a spherical aberration is in undercorrection state and it becomes difficult to correct a distortion, a astigmatism and a chromatic aberration, while the petzval sum decreases.

Condition (4) is desirable for compactization of the objective and for keeping a vignetting small. If the upper limit of the condition (4) is violated, the vignetting and the field curvature increase. In contrast thereto, if the lower limit of the condition (4) is violated, the total length of the lens system including the back focal distance increases so long that it is difficult to construct the lens system with compact in size, while the vignetting becomes small.

Condition (5) is desirable for decreasing the change of aberrations depending on the decentering of the third lens element ($L_3$) from the optical axis defined by the first ($L_1$) and second ($L_2$) lens elements. If the upper limit of condition (5) is violated, the vignetting at a large angular portion of the field increases and it becomes difficult to correct the field curvature well. On the other hand, if the lower limit of condition (5), the focal length of the third lens element ($L_3$) becomes so short that the change of aberrations depending on the decentering of the third lens element ($L_2$) increases.

Furthermore, for correcting aberrations more satisfactory, the lens system is recommended to fulfill the following condition instead of the condition (5).

$$0.32 < f_3/f < 0.5 \quad (6)$$

According to this invention, the first ($L_1$) and second ($L_2$) lens elements are formed of plastic, so that it becomes easier to employ an aspherical surface. Especially, when the aspherical surface is employed for at least one surface of the first lens element ($L_1$), the spherical aberration, the distortion, the field curvature and the coma which are not so satisfactory corrected in case of an object consisting of only spherical lens elements can be corrected almost completely.

The following tables 1 to 4 disclose, respectively design parameters of embodiments 1 to 4 of the present invention. In the embodiments $r_1$, $r_2$, $r_3$ . . . is respectively the radius of curvature from the object side, and the $d_1$, $d_2$, $d_3$ . . . is respectively the axial thickness including both air spaces and the actual thickness of a lens element. $Nd_1$, $Nd_2$, $Nd_3$ is respectively the refractive index of the first through third lens element and $\nu d_1$, $\nu d_2$, $\nu d_3$ is respectively the abbe number of the first ($L_1$) through third lens element ($L_3$). A surface with the mark * represents an aspherical surface, whose configuration is defined as follows:

$$X = \frac{Y^2}{ri + ri\sqrt{1 - \left(\frac{Y}{ri}\right)^2}} + AY^2 + BY^4 + CY^6 + DY^8 + EY^{10} + FY^{12} + \ldots$$

wherein, X represents the coordinate along the optical axix measured from an imaginary plane tangent to the aspherical surface perpendicularly to the optical axis, Y represents the coordinate perpendicular to the optical axis from the optical axis, ri represents a paraxial radius of curvature, and A, B, C, D, ... is aspherical coefficient.

TABLE 1

Embodiment 1
$f = 100$  $F_{No.} = 3.5$  $2w = 60°$

| | | radius of curvature | | axial distance | | refractive index | | Abbe number |
|---|---|---|---|---|---|---|---|---|
| $L_1$ | $r_1^*$ | 28.581 | $d_1$ | 11.403 | $N_1$ | 1.49140 | $\nu_1$ | 57.82 |
| | $r_2$ | 43.298 | | | | | | |
| | | | $d_2$ | 4.191 | | | | |
| $L_2$ | $r_3$ | −46.546 | $d_3$ | 3.400 | $N_2$ | 1.58400 | $\nu_2$ | 31.00 |
| | $r_4$ | 33.494 | | | | | | |
| | | | $d_4$ | 1.300 | | | | |
| $L_3$ | $r_5$ | 50.000 | $d_5$ | 6.822 | $N_3$ | 1.80500 | $\nu_3$ | 40.97 |
| | $r_6$ | −51.016 | | | | | | |
| | | | $d_6$ | 4.737 | | | | |
| S | $r_7$ | ∞ | | | | | | |

| aspheric surface coefficients | | parameters | |
|---|---|---|---|
| A | = 0.0 | $N_3-N_1$ | = 0.314 |
| B | = −0.58716 × $10^{-7}$ | $N_2/N_3$ | = 0.878 |
| C | = 0.14066 × $10^{-8}$ | $d_2/d_4$ | = 3.224 |
| D | = −0.32495 × $10^{-10}$ | $|f_{12}|/f$ | = 0.559 |
| E | = 0.14141 × $10^{-12}$ | $f_3/f$ | = 0.3223 |
| F | = −0.17872 × $10^{-15}$ | | |

TABLE 2

Embodiment 2
$f = 100$  $F_{No.} = 3.5$  $2w = 60°$

| | | radius of curvature | | axial distance | | refractive index | | Abbe number |
|---|---|---|---|---|---|---|---|---|
| $L_1$ | $r_1^*$ | 28.405 | $d_1$ | 11.402 | $N_1$ | 1.49140 | $\nu_1$ | 57.82 |
| | $r_2$ | 42.904 | | | | | | |
| | | | $d_2$ | 4.183 | | | | |
| $L_2$ | $r_3$ | −46.694 | $d_3$ | 3.400 | $N_2$ | 1.58400 | $\nu_2$ | 31.00 |
| | $r_4$ | 33.804 | | | | | | |
| | | | $d_4$ | 1.300 | | | | |
| $L_3$ | $r_5$ | 51.000 | $d_5$ | 6.671 | $N_3$ | 1.82050 | $\nu_3$ | 43.00 |
| | $r_6$ | −52.571 | | | | | | |
| | | | $d_6$ | 4.737 | | | | |
| S | $r_7$ | ∞ | | | | | | |

| aspheric surface coefficients | | parameters | |
|---|---|---|---|
| A | = 0.0 | $N_3-N_1$ | = 0.329 |
| B | = 0.34706 × $10^{-7}$ | $N_2/N_3$ | = 0.870 |
| C | = 0.37596 × $10^{-9}$ | $d_2/d_4$ | = 3.218 |
| D | = −0.29099 × $10^{-10}$ | $|f_{12}|/f$ | = 0.566 |
| E | = 0.14248 × $10^{-12}$ | $f_3/f$ | = 0.325 |
| F | = −0.18383 × $10^{-15}$ | | |

TABLE 3

Embodiment 3
$f = 100$  $F_{No.} = 3.5$  $2w = 60°$

| | | radius of curvature | | axial distance | | refractive index | | Abbe number |
|---|---|---|---|---|---|---|---|---|
| $L_1$ | $r_1^*$ | 27.747 | $d_1$ | 11.364 | $N_1$ | 1.49140 | $\nu_1$ | 57.82 |
| | $r_2$ | 45.438 | | | | | | |
| | | | $d_2$ | 4.206 | | | | |
| $L_2$ | $r_3$ | −60.616 | $d_3$ | 3.200 | $N_2$ | 1.58400 | $\nu_2$ | 31.00 |
| | $r_4$ | 34.522 | | | | | | |
| | | | $d_4$ | 1.500 | | | | |
| $L_3$ | $r_5$ | 54.400 | $d_5$ | 7.386 | $N_3$ | 1.80500 | $\nu_3$ | 40.97 |
| | $r_6$ | −61.975 | | | | | | |
| | | | $d_6$ | 4.737 | | | | |
| S | $r_7$ | ∞ | | | | | | |

| aspheric surface coefficients | | parameters | |
|---|---|---|---|
| A | = 0.0 | $N_3-N_1$ | = 0.314 |
| B | = 0.28547 × $10^{-5}$ | $N_2/N_3$ | = 0.878 |
| C | = −0.16114 × $10^{-7}$ | $d_2/d_4$ | = 2.804 |
| D | = 0.13227 × $10^{-9}$ | $|f_{12}|/f$ | = 0.732 |
| E | = −0.46555 × $10^{-12}$ | $f_3/f$ | = 0.370 |
| F | = 0.49329 × $10^{-15}$ | | |

TABLE 4

Embodiment 4
$f = 100$  $F_{No.} = 3.5$  $2w = 60°$

| | | radius of curvature | | axial distance | | refractive index | | Abbe number |
|---|---|---|---|---|---|---|---|---|
| $L_1$ | $r_1^*$ | 29.764 | $d_1$ | 11.403 | $N_1$ | 1.49140 | $\nu_1$ | 57.82 |
| | $r_2$ | 46.420 | | | | | | |
| | | | $d_2$ | 4.191 | | | | |
| $L_2$ | $r_3$ | −46.621 | $d_3$ | 3.400 | $N_2$ | 1.58400 | $\nu_2$ | 31.00 |
| | $r_4$ | 36.165 | | | | | | |
| | | | $d_4$ | 1.300 | | | | |
| $L_3$ | $r_5$ | 54.768 | $d_5$ | 6.770 | $N_3$ | 1.81100 | $\nu_3$ | 44.88 |
| | $r_6$ | −51.016 | | | | | | |
| | | | $d_6$ | 4.737 | | | | |
| S | $r_7$ | ∞ | | | | | | |

| aspheric surface coefficients | | parameters | |
|---|---|---|---|
| A | = 0.0 | $N_3-N_1$ | = 0.320 |
| B | = −0.40165 × $10^{-6}$ | $N_2/N_3$ | = 0.875 |
| C | = 0.33894 × $10^{-8}$ | $d_2/d_4$ | = 3.224 |
| D | = −0.38542 × $10^{-10}$ | $|f_{12}|/f$ | = 0.587 |
| E | = 0.14267 × $10^{-12}$ | $f_3/f$ | = 0.335 |
| F | = −0.17391 × $10^{-15}$ | | |

As can be readily appreciated, it is possible to deviate from the above embodiments of the present invention and, as will be readily understood by those skilled in the optical art, the invention is capable of many modifications and improvements within the scope and spirt thereof. Accordingly, it will be understood that the invention is not to be limited by these specific embodiments, but only by the scope and spirit of the appended claims.

What is claimed is:
1. A triplet type objective comprising,
(a) a lens system which includes from the object side;

a first positive meniscus lens element having an object side surface convex to the object side, a second biconcave lens element, a third biconvex lens element, wherein, the first and the second lens elements are formed of plastic and the third lens element is formed of glass, and (b) a diaphragm arranged behind the lens system, (c) wherein the lens system fulfills the following conditions:

$$0.15 < N_3 - N_1 < 0.45$$

$$0.75 < N_2/N_3 < 0.90$$

wherein:

$N_1$ represents the refractive index of the first lens element;

$N_2$ represents the refractive index of the second lens element;

$N_3$ represents the refractive power of the third lens element.

2. A triplet type objective as claimed claim 1, wherein the triplet type objective fulfills the following conditions:

$$2.5 < d_2/d_4 < 4.0$$

$$0.55 < |f_{12}|/f < 0.8$$

$$0.3 < f_3/f < 0.6$$

wherein, $d_2$ represents the axial distance between the first lens element and the second lens element;

$d_4$ represents the axial distance between the second lens element and the third lens element;

$f_{12}$ represents the compound focal length of the first and the second lens elements;

$f_3$ represents the focal length of the third lens element;

$f$ represents the focal length of the lens objective.

3. A triplet type objective as claimed claim 1, wherein one of the surfaces of the first lens element is an aspherical surface.

* * * * *